United States Patent [19]

Iizuka et al.

[11] Patent Number: 4,773,294

[45] Date of Patent: Sep. 27, 1988

[54] MUSICAL COMPOSITION PARAMETER SELECTING DEVICE FOR ELECTRONIC MUSICAL INSTRUMENT

[75] Inventors: Akira Iizuka; Keiji Kawakami, both of Hamamatsu, Japan

[73] Assignee: Yamaha Corporation, Hamamatsu, Japan

[21] Appl. No.: 133,242

[22] Filed: Dec. 10, 1987

Related U.S. Application Data

[63] Continuation of Ser. No. 824,000, Jan. 29, 1986, abandoned.

[30] Foreign Application Priority Data

Jan. 31, 1985 [JP] Japan .................................. 60-17602

[51] Int. Cl.[4] ......................... G10H 1/06; G10H 1/40; G10H 7/00; G09B 15/02

[52] U.S. Cl. ...................................... 84/1.01; 84/1.03; 84/1.19; 84/477 R; 84/DIG. 12

[58] Field of Search .............. 84/1.01, 1.03, 1.19–1.27, 84/477 R, DIG. 12

[56] References Cited

U.S. PATENT DOCUMENTS 3,992,969 11/1976 Robinson et al. .................... 84/1.01
4,176,577 12/1979 Yamada et al. ...................... 84/1.01
4,283,983 8/1981 Kashio ................................ 84/1.19
4,365,532 12/1982 Nakada et al. ....................... 84/1.19
4,391,176 7/1983 Niinomi et al. .................. 84/1.19 X
4,492,142 1/1985 Oya et al. ............................ 84/1.03

*Primary Examiner*—Stanley J. Witkowski
*Attorney, Agent, or Firm*—Spensley Horn Jubas & Lubitz

[57] ABSTRACT

There is provided a selection switch for selecting musical information determining characteristics of a tone such as a tone color. This selection switch is pre-assigned with first musical information. Switches and circuits are provided for assigning second musical information to the selection switch. This second musical information is one selected as desired from among plural musical information. Thus, at least two musical information of the pre-assigned first musical information and the selectively assigned second musical information are assigned to the selection switch. There is also provided a mode selection switch. When a first mode has been selected by this mode selection switch, a characteristic of a tone to be produced is determined by the first musical information. When the second mode has been selected, a characteristic of a tone to be produced is determined by the second musical information.

19 Claims, 12 Drawing Sheets

MUSICAL COMPOSITION PARAMETER SELECTING DEVICE FOR ELECTRONIC MUSICAL INSTRUMENT

This is a continuation of copending application Ser. No. 824,000 filed on Jan. 29, 1986, and now abandoned.

BACKGROUND OF THE INVENTION

This invention relates to an electronic musical instrument having switches for selecting a tone control function such as a tone color.

In an electronic musical instrument generally, separate tone color selection switches are provided with respect to respective selectable tone colors. Similarly, separate selection switches are provided for various tone effects and other functions. The number of tone colors, effects and other tone control functions selectable in the electronic musical instrument therefore is limited to the number of selection switches provided on an operation panel. If it is desired, to increase the number of the tone color functions, the number of the selection switches must be increased accordingly with resulting increase in the cost and difficulties in securing space for disposing switches and in ensuring a sufficient operability. When, for example, the tone color is to be changed during the performance of the keyboard, there is likelihood that the player cannot find a desired tone color selection switch readily or, if he can find it readily, he erroneously operates a wrong switch by mistake, if there are too many switches.

Besides, in an electronic musical instrument, there are provided one or more tone groups consisting of plural tone colors, effects or other tone control functions which tone groups are grouped in accordance with some common factor such as the kind of keyboard or the tone generation system and various tone control functions such as tone colors and effects can be independently selected tone group by tone group. Accordingly, separate selection means must be provided for respective tone groups even for the same function (e.g. the same tone color) so that the same problem as described above arises as a result of increase in the number of selection switches.

For improving operability of tone color selection switches during the performance of the keyboard, it has recently been proposed to select a tone color by providing a predetermined small number of switches as switches to be operated during the performance, selecting some tone colors from among numerous selectable tone colors and prestoring the selected tone colors in correspondence to these small number of switches, and selectively operating these switches during the performance. This method however has the disadvantage that it cannot cope with a situation in which the player desired to select, during the performance of the keyboard, a tone color instantly from among a relatively large number of switches which correspond one to one to a relatively large number of tone colors. Such selection operation can be made if a group of switches consisting of a relatively large number of selection switches which correspond one to one to a relatively large number of tone colors are provided additionally with the predetermined small number of switches. This however will apparently result in increase in the total number of switches.

SUMMARY OF THE INVENTION

It is, therefore, an object of the invention to provide an electronic musical instrument with a reduced number of selection means such as switches for selecting various tone control functions in comparison with the number of selectable tone control functions.

It is another object of the invention to provide an electronic musical instrument capable of overcoming the above described problems and, more specifically, to realize a selection device for selecting tone control functions such as tone colors and effects which is capable of coping with different kinds of selection operations with a reduced number of switches.

It is another object of the invention to provide an electronic musical instrument having tone generation systems each being capable of independently selecting tone control functions such as tone colors and effects with a reduced number of selection means as a whole by sharing selection means selecting tone control functions among the respective systems.

It is still another object of the invention to provide, for the purpose of preventing monotonousness which tends to occur as a result of the common tone control being applied to the respective systems by sharing the selection means among the respective systems as described above, an electronic musical instrument which is capable of varying contents of control for the respective systems even when the same tone control function has been selected by these systems.

An electronic musical instrument achieving the above object of the invention comprises musical information supply means pre-assigned with first musical information determining characteristics of a tone, assignment means for assigning second musical information selected from among plural musical information to said musical information supply means, mode selection means for selecting a first mode or a second mode from among plural modes, and tone signal forming means supplied with the first musical information by said musical information supply means when said first mode has been selected and supplied with the assigned second musical information by said musical information supply means when said second mode has been selected, for forming a tone signal corresponding to a tone having characteristics determined by the supplied musical information.

FIG. 1A schematically shows an outline of this invention. The musical information supply means is designated by reference numeral 100, the assignment means by 101, the mode selection means by 102 and the tone signal forming means by 103 respectively.

FIG. 1B schemtically shows an outline of the invention as viewed from a different aspect. A selection switch section 1 comprises switches 1*a*-1*n* each of which can select its proper tone control function. The "tone control function" herein means all functions capable of controlling a tone such as various tone colors and tone effects. In other words, the "tone control function" means musical information determining characteristics of a tone.

The selection switch section 1 therefore may comprise various tone color selection switches, effect selection switches and other selection switches and tone control or setting switches or may comprise only a part of such switches.

In a predetermined one or more switches 1*i*-1*n* in switches 1*a*-1*n*, a selectable tone control function is changed in accordance with a first mode or second mode selected by mode selection means 2. In the first mode, it is possible to select a tone control function proper to each switch. If this is schematically shown, when the first mode is selected by a selection switch 2*a*, an output of the predetermined switches 1*i*–1*n* is coupled to means 3 for generating and controlling a tone for selecting one of tone control functions which are affixed to the switches 1*i*–1*n*. The other switches 1*a*–1*h* are always connected to the means 3 for selecting their respective predetermined proper tone control functions. In the second mode, it is possible to select a tone control function assigned to the switches 1*i*–1*n* by function assignment means 4.

The function assignment means 4 is provided for selectively, assigning one of tone control functions in correspondence to the predetermined switches 1*i*–1*n*. This function assignment means 4 may comprise selection means for selecting a tone control function to be assigned to the switches 1*i*–1*n* and memory means for storing information representing the selected tone control function in correspondence to the switches 1*i*–1*n*. This selection means may include exclusive switches or may be constituted commonly by the switches in the selection switch section 1.

If a state in which the second mode has been selected is schematically shown, gating means 2*c* is opened by the mode selection switch 2*a* and an output of the predetermined switches 1*i*–1*n* is coupled to the means 3 for generating and controlling a tone via the function assignment means 4 and the gating means 2*c*. Thus, a tone control function assigned to the function assignment means 4 in correspondence to the switches 1*i*–1*n* can be selected by the particular one of the switches 1*i*–1*n*.

The means 3 for generating and controlling a tone generates, responsive to the output of the switches 1*i*–1*n*, a tone which is controlled in accordance with a tone control function determined according to the mode selected by the mode selection means 2 (i.e., either the proper tone control function or the selectively assigned tone control function). The means 3 can of course generate, responsive to outputs of the other switches 1*a*–1*h*, tones which are controlled in accordance with tone control functions which are proper to the respective switches.

In FIG. 1*b*, in a case where the first mode has been selected, all of the switches 1*a*–1*n* in the selection switch section 1 act upon the means 3 for generating and controlling a tone as switches for selecting the tone control functions proper to them. In a case where the second mode has been selected, the tone control functions corresponding to the predetermined switches 1*i*–1*n* in the selection switch section 1 can be freely changed in accordance with the assignment by the function control means 4. Accordingly, notwithstanding that there are relatively many selectable tone control functions (corresponding in number to functions assignable in the function assignment means 4), the selection operation can be made by using a relatively small number of switches 1*i*–1*n* so that operability during the keyboard performance is improved. Further, by changing the mode, these switches 1*i*–1*n* are converted immediately to switches for selecting tone control functions proper to them like the switches 1*a*–1*h* and, accordingly, if the player wishes to immediately select a switch corresponding to a desired tone control function from among a relatively large number of switches which correspond one-to-one to a relatively large number of tone control functions, he can readily make such selection. Moreover, the construction which enables such flexible switching in the selection operation can be realized with the minimum number of switches by using commonly the predetermined switches 1*i*–1*n* in the case of selecting the proper tone control function and the case of selecting the tone control function which can be changed by the assignment operation.

An electronic musical instrument achieving the other object of the invention is characterized in that it has a plurality of tone generation systems and comprises selection means for selecting musical information determining characteristics of a tone and being used commonly by said respective systems, supply means for supplying to said respective systems data corresponding to musical information selected independently for said respective systems by said selection means, and tone forming means for said respective systems for forming tones controlling in accordance with the data supplied by said supply means, a tone being formed in at least one of said tone generation systems of said respective systems in a differently controlled state from a tone controlled in the other systems with respect to the same musical information selected by said selection means.

An outline of the electronic musical instrument of this invention will be described with reference to FIG. 2. Tone forming means TF1–TFn are provided in correspondence to plural tone generation systems TG1–TGn. A tone signal corresponding to a key depressed in a keyboard section KBS is formed in one or more of the tone forming means TF1–TFn of the systems TG1–TGn corresponding to a key range or keyboard to which the depressed key belongs. The tone generation systems TG1–TGn correspond to plural tone groups for which tone control functions such as tone colors and effects can be independently selected. Selection means SLC can select a predetermined tone control function such as tone color, i.e., musical information determining characteristics of a tone and is utilized commonly for the respective systems TG1–TGn. Although the systems TG1–TGn can select various tone control functions independently from one another, the selection means SLC for performing this selection is provided not separately but commonly through the respective systems. For supplying data corresponding to the tone control function selected by the selection means SLC separately to the respective systems, supply means PV1–PVn are provided. The selection of a tone control function by the selection means SLC is made independently for each of the systems. Depending upon which system the selection corresponds to, supply of the data is made through one of the supply means PV1–PVn corresponding to the system. The tone forming means TF1–TFn for the respective systems form the tone signals in a state in which they are controlled in accordance with data supplied from the corresponding supply means PV1–PVn. If, for example, the selected tone control function is a certain tone color, a tone signal imparted with this tone color is formed.

A tone is preferably formed in at least one of the tone forming means (i.e., at least one of TF1–TFn) of the respective systems in a differently controlled state from a tone controlled in the tone forming means of the other systems (i.e., the rest of TF1–TFn) with respect to the same tone control function selected by the selection means SLC. If, accordingly, the same tone color, for example, has been selected by the selection means SLC for plural systems, the tone forming means corresponding to these systems do not form tone signals of the entirely same tone color but respectively form tone signals which differ in some respect from one another despite their nominal same tone color.

In FIG. 2, the selection means SLC need not be provided separately for the respective systems but it will suffice if it is provided for one system only. Accordingly, the number of the selection means can be reduced in respect of the entire electronic musical instrument. Further, by differring tone control states system by system even if the same tone control function has been selected for these systems, monotonousness in the tone control which could occur when the selection means has been used commonly by the respective systems can be prevented whereby tone control suited to the respective systems can be achieved.

An embodiment of the present invention will now be described with reference to the accompanying drawings.

BRIEF DESCRIPTION OF THE DRAWINGS

In the accompanying drawings.

DESCRIPTION OF PREFERRED EMBODIMENTS

Description of Hardware construction

Figure 1A:
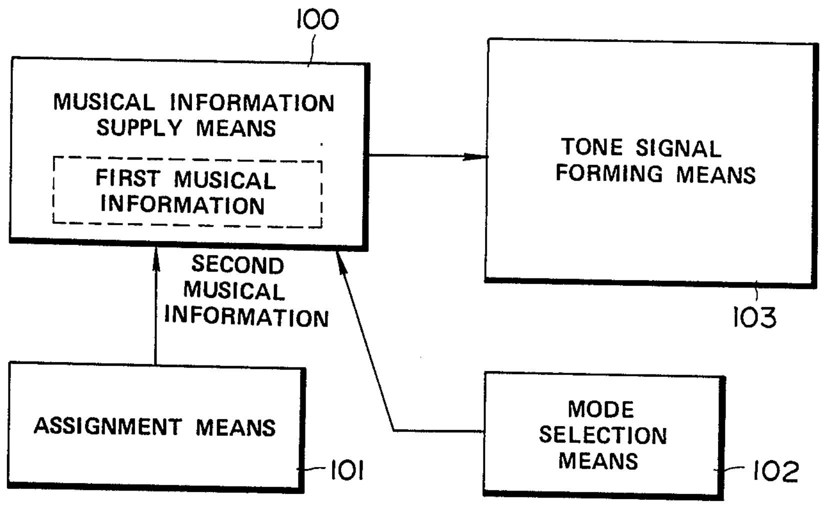
FIGS. 1A and 1B are block diagrams showing an outline of the present invention.
Figure 1B:
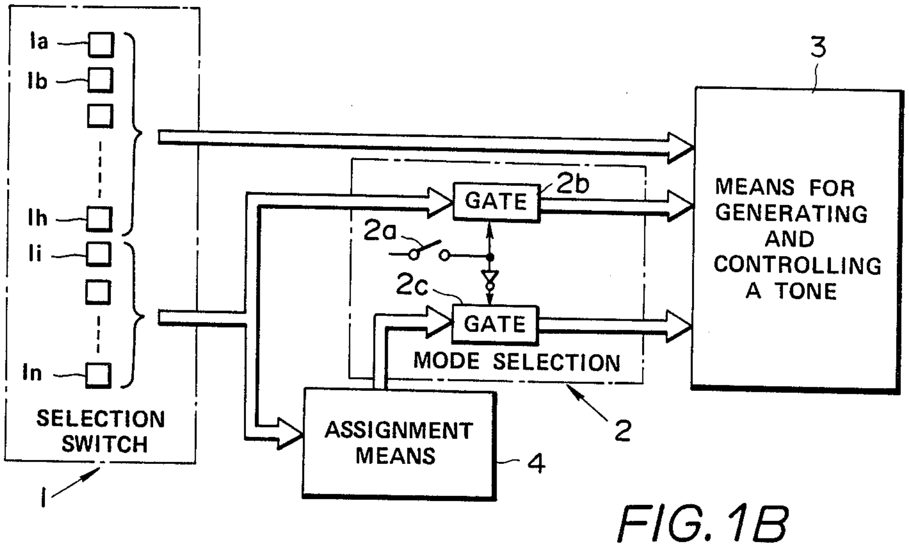
Figure 2:
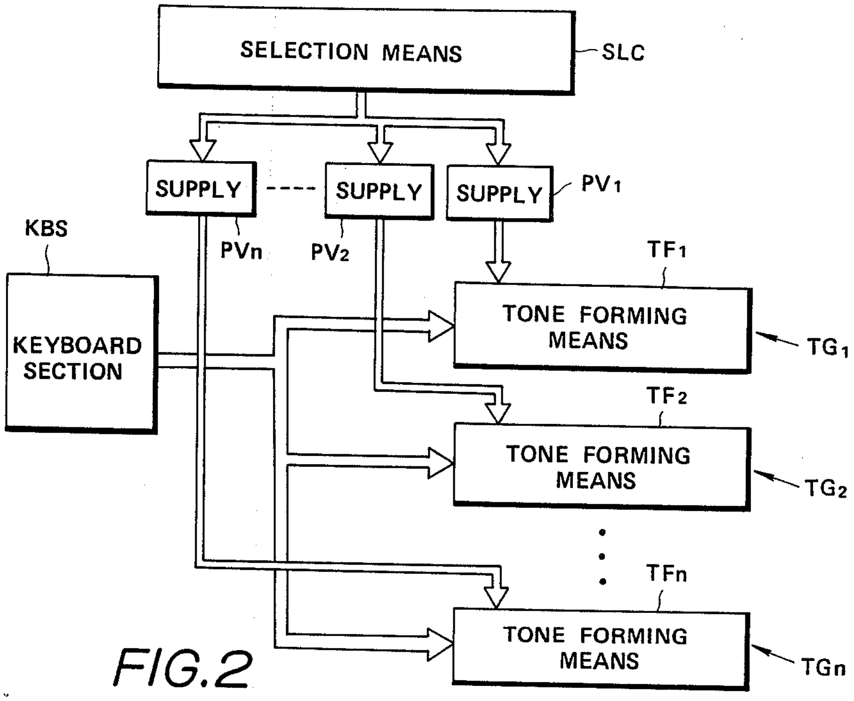
FIG. 2 is a block diagram showing another outline of the invention.
Figure 3:
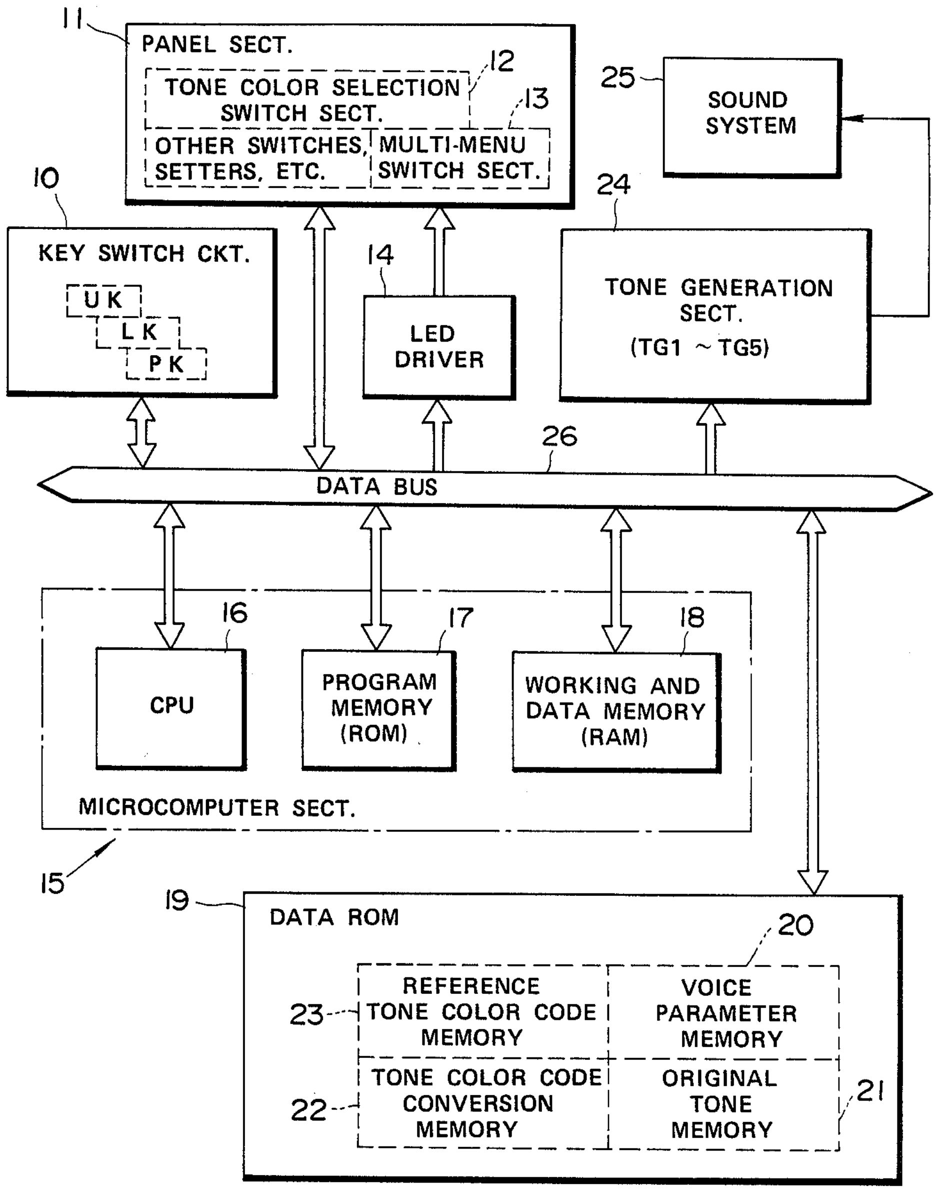
FIG. 3 is a diagram showing an electrical hardware construction of an embodiment of an electronic musical instrument according to the invention.

FIG. 3 shows a hardware construction of an embodiment of the electronic musical instrument according to the present invention. A key switch circuit 10 is a circuit in which key switches corresponding to keys in a keyboard are arranged. The keyboard consists, for example, of an upper keyboard, a lower keyboard and a pedal keyboard. In the following description, the upper keyboard, lower keyboard and pedal keyboard are respectively abbreviated in some cases as UK, LK and PK. A panel section 11 includes switches for selecting various tone control functions, other switches, setters, operating knobs and indicators. Switches relating to the present invention are those belonging to a tone color selection switch section 12 and a multi-menu switch section 13. In this embodiment, the invention has been applied to the tone color selection switch section 12. In comparison with FIG. 1, the tone color selection switch section 12 corresponds to the selection switch section 12. As will become apparent later, the multi-menu switch section 13 is provided for selecting, from among a plurality of tone colors, a tone color to be assigned to a predetermined switch in the tone color selection switch section 12.

The respective switches or volume setter provided in the panel 11 have lighting indication means such as light emitting diodes (hereinafter referred to as LED) in correspondence thereto. An LED driver 14 supplies a drive signal to these LEDs or lighting indication means in the panel section 11.

In this embodiment, ON-OFF detection scanning and various data processing operations based thereon are performed by using a microcomputer section 15 which includes a central processing unit (CPU) 16, a program memory 17 and a working and data memory 18. A data ROM 19 prestores various data such as parameters necessary for the tone setting control and includes a voice parameter memory 20, an original tone memory 21, a tone color code conversion memory 22 and a reference tone color code memory 23.

A tone generation section 24 includes tone generation systems TG1–TG5 corresponding respectively to tone groups for each of which a tone color and a tone effect can be selected independently. The respective sections are connected to the microcomputer section 15 via a data bus 26 and data including data of a depressed key and data of a selected tone color are supplied to the tone generation section 24 by processing performed in the microcomputer section 15. The tone generation section 24 generates, in response to these data, a tone signal in a predetermined one of the tone generation systems TG1–TG5. The tone signal generated by the tone generation section 24 is supplied to a sound system 25.

Description in detail of the switch section

Figure 4:
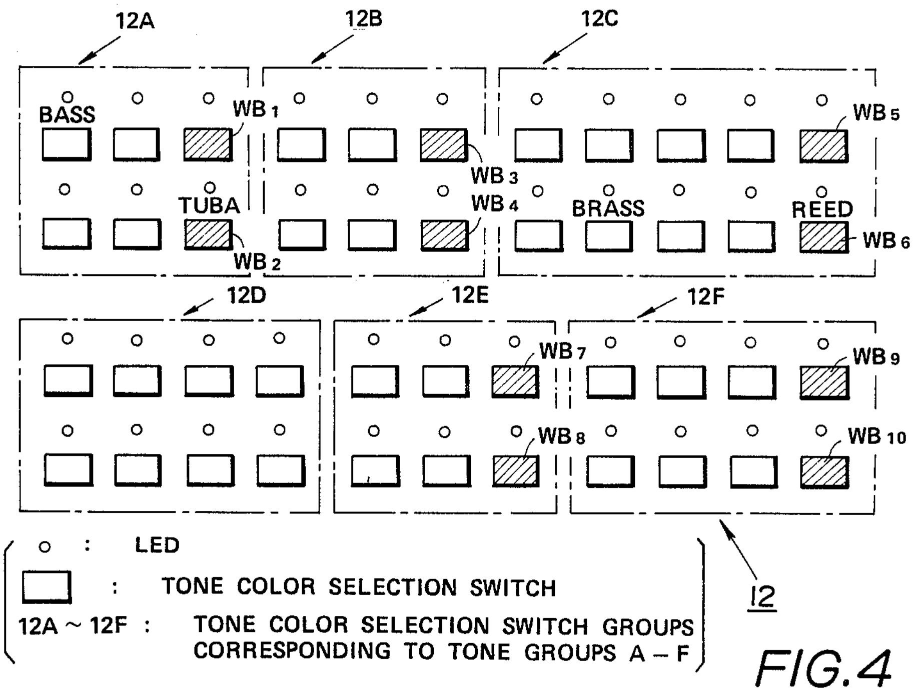
FIG. 4 is a plan view showing an example of disposition of switches in a tone color selection switch section in FIG. 3.

FIG. 4 shows an example of arrangement of the respective switches in the tone color selection switch section 12. These switches are push-button switches and depicted as rectangular push buttons in the figure. The small circles depicted above these push buttons designate the LEDs indicating ON-OFF states of these switches.

Each of the switches of the tone color selection switch section 12 is capable of selecting a tone color proper to the switch (hereinafter sometimes referred to as "original tone"). The names of selectable tone colors are described above some of the push buttons. For convenience of illustration, the names of tone colors such as "BRASS" and "TUBA" are described only above a part of the switches in FIG. 4.

Switches $WB_1$-$WB_{10}$ in the tone color selection switch section 12 are distinguished from other switches by a different color. In the figure, these switches are shaded for representing the different color. For example, these switches $WB_1$-$WB_{10}$ are tinted in white or gray and these switches are conveniently referred to as "white switches". These white switches $WB_1$-$WB_{10}$ correspond to the switches $1i$-$1n$ in FIG. 1. In the first mode, these switches $WB_1$-$WB_{10}$ correspond to their proper tone colors but, in the second mode, they correspond to any desired tone colors which have been selectively assigned.

In the tone color selection switch section 12, tone color selection switches are provided in correspondence to the plural tone groups. In this embodiment, there are six tone groups for which tone color can be selected independently and these six tone groups are designated by reference characters A-F. The tone color selection switch section 12 is divided into six switch groups 12A-12F in correspondence to the respective tone groups A-F.

Specific examples of the respective tone groups A-F are as follows:

The tone group A produces a tone of a key depressed in the pedal keyboard itself.

The tone group B produces a tone of a key depressed in the lower keyboard in such a manner that plural tones can be produced simultaneously. An envelope of a sustained tone type is employed as an envelope of the tone.

The tone group C produces a tone of a key depressed in the upper keyboard in such a manner that plural tones can be produced simultaneously. An envelope of a sustained tone type is employed also as an envelope of the tone.

The tone group D produces an automatic arpeggio tone.

The tone group E produces a tone of a key depressed in the upper keyboard or lower keyboard itself.

The tone group F produces a tone of a key depressed in the upper keyboard or lower keyboard with an envelope of a decaying tone type in such a manner that plural tones can be produced simultaneously.

Correspondence between the tone groups A-F and the tone generation systems TG1-TG5 in the tone generation section 24 is such that the tone group A corresponds to the system TG1, the tone group B to the system TG2, the tone group C to the system TG3, the tone group D to the system TG4, the tone groups E and F to the system TG5. Selections as to which of the tone groups E and F the tone generation system TG5 is used for and which of the upper keyboard and the lower keyboard the tone generation system TG5 is used for are made by unillustrated selection switches.

Figure 5:
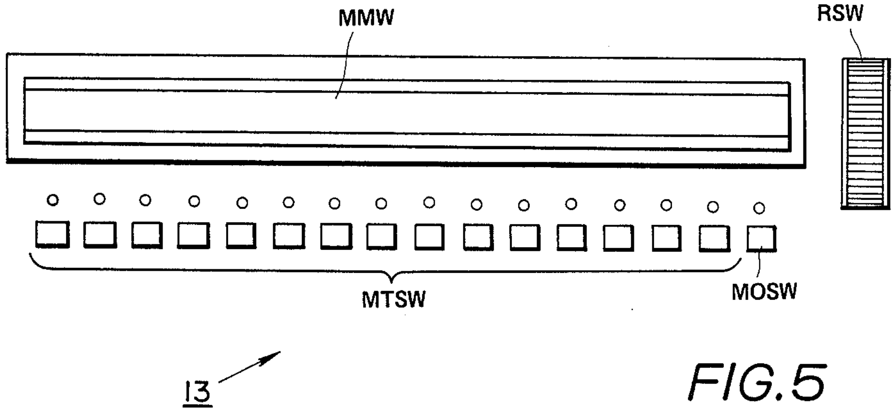
FIG. 5 is a plan view showing an example of a multi-menu switch section in FIG. 3.

FIG. 5 is a plan view showing an example of the multi-menu switch section 13. The multi-menu switch section 13 performs a tone color selection function for selecting, from among plural tone colors, a tone color to be assigned to one of the white switches $WB_1$-$WB_{10}$ in the tone color selection switch section 12 and a mode selection function for selecting one of the first and second modes.

For selecting a tone color, 15 multi-menu tone color selection switches MTSW of a push-button type are provided. For selecting a mode, a single multi-menu ON switch MOSW of a push-button type is provided. There are also provided LEDs for the respective push-button switches for indicating ON-OFF states of these switches.

A rotary switch RSW is capable of switching a menu display appearing in a multi-menu window MMW by rotating its knob and has a switch which produces an output corresponding to the menu display set in the menu window MMW.

Figure 6:
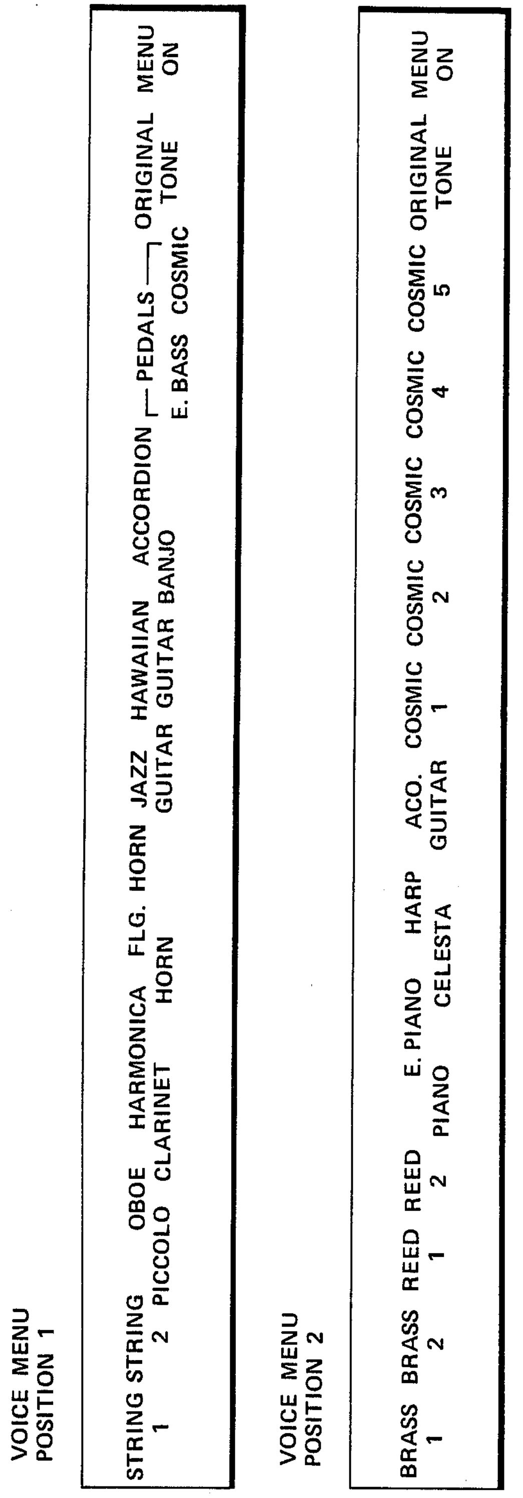
FIG. 6 is a diagram showing examples of display of two voice menu positions selectively settable by a rotary switch in the multi-menu switch section in FIG. 5.

FIG. 6 shows an example of the menu indication. In the menu indication, names of tone colors which can be selected by the fifteen tone color selection switches MTSW are indicated in positions corresponding to these switches MTSW. For example, in voice menu position 1, fifteen types of tone colors ranging from "string 1" to "original tone" can be selected by the switches MTSW. In voice menu position 2, fifteen types of tone colors ranging from "brass 1" to "original tone" can be selected by the switches MTSW. In this embodiment, the "original tone" is selectable in the multi-menu switch section 13 to enable the original tone of the white switch itself to be assigned. This is however not essential but another tone may be selected.

By suitably combining the rotary switch RSW and the multi-menu tone color selection switches MTSW, any desired tone color can be selected from among tone colors which are much greater in number than the number of these switches.

The multi-menu ON switch MOSW performs the same function, i.e., the function of selecting ON-OFF of the multi-menu mode, regardless of which of the voice menu 1 and voice menu 2 has been selected. Each time this switch MOSW is pushed, the ON-OFF state of the multi-menu mode is alternately switched. When the multi-menu mode is ON, the LED corresponding to this switch MOSW is lighted thereby indicating the multi-mode ON state.

In the multi-menu mode, a desired tone color can be selected in the multi-menu switch section 13 and this tone color can be assigned to one of the white switches $WB_1$-$WB_{10}$. It is also possible in this mode to select the tone color assigned to one of the white switches $WB_1$-$WB_{10}$ by operating this white switch. The multi-mode therefore corresponds to the above described second mode.

A mode in which the multi-menu mode is OFF is hereinafter called a panel mode. This panel mode corresponds to the above described first mode. That is, a proper tone to each of the white switches $WB_1$-$WB_{10}$ (original tone) can be selected by operating the white switch.

Regardless of whether the mode is the multi-menu mode or the panel mode, switches other than the white switches $WB_1$-$WB_{10}$ in the tone color selection switch section 12 can always select their proper tones. It is also possible to modify the arrangement so that these switches are disabled and the white switches $WB_1$–$WB_{10}$ only are enabled during the multi-menu mode.

Figure 7:
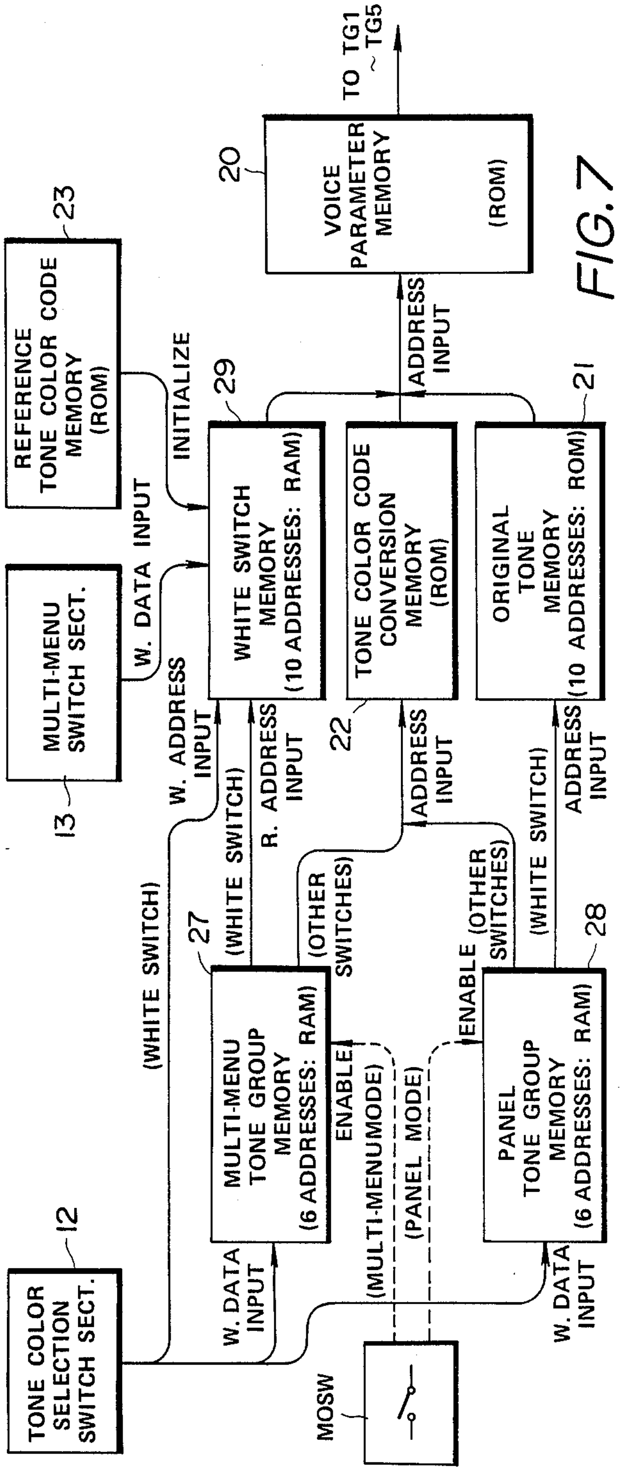
FIG. 7 is a block diagram generally showing flow of data between memories included in a working and data memory and a data ROM in FIG. 3 and their peripheral devices.

Description about memories and registers and description about the flow of main information centering on the memories FIG. 7 is a block diagram showing various memories capable of both reading and writing included in a working and data memory 18 and memories 20–23 consisting of read-only memories and showing generally the flow of information between the tone color selection switch section 12 and the multi-menu switch section 13.

A multi-menu tone group memory 27, a panel tone group memory 28 and a white switch memory 29 are memories capable of reading and writing included in the working and data memory 18.

The multi-menu tone group memory 27 has six addresses corresponding to the above described six tone groups A–F and writes and stores, in the multi-menu mode, code signals (hereinafter called "switch codes") representing switches which are ON in the tone color selection switch groups 12A–12F corresponding to the respective tone groups. In other words, this memory stores switch codes corresponding to tone colors which have presently been selected for the respective tone groups. The switch codes stored in this memory 27 are read out as required in the multi-menu mode and used as data representing which switches have presently been selected in the respective tone groups.

Like the memory 27, the panel tone group memory 28 has six addresses corresponding to the tone groups A–F and writes and stores switch codes representing switches which are ON in the tone selection switch groups 12A–12F during the panel mode. The switch codes stored in this memory 28 are read out as required in the panel mode and used as data representing which switches in the respective tone groups have presently been selected.

The white switch memory 29 has ten addresses corresponding to the respective white switches $WB_1$–$WB_{10}$ and stores code signals (hereinafter referred to as "tone color codes") representing tone colors assigned to the respective white switches. Writing of data, i.e., assignment of data, to this memory 29 is effected by designating a write address by pushing a desired one of the white switches $WB_1$–$WB_{10}$ in the multi-menu mode while performing the operation for selecting a desired tone color in the multi-menu switch section 13 as described above, and writing the tone color code of the selected tone color in the designated address (i.e., white switch).

The standard tone color code memory 23 stores tone color codes representing standard tone colors to be assigned to the respective white switches $WB_1$–$WB_{10}$. When a power switch has been thrown in, standard tone colors corresponding to the respective white switches are read out from this memory 23 and initially set at the respective addresses of the memory 29.

The white switch memory 29 is read during the multi-menu mode in accordance with switch codes of the white switches read out from the multi-menu tone group memory 27. When, accordngly, one of the white switches has been depressed in the multi-menu mode, a tone color code stored (assigned) in the corresponding address is read out from the white switch memory 29.

The original tone memory 21 has ten addresses corresponding to the respective white switches $WB_1$–$WB_{10}$ and prestores tone color codes representing tone colors proper to the respective white switches (original tones). This memory 21 is read during the panel mode in accordance with switch codes of the white switches read out from the panel tone group memory 28.

The tone color code conversion memory 22 is provided for converting switch codes to tone color codes. Switch codes of the tone color selection switches other than the white switches read out from the multi-menu tone group memory 27 and the panel tone group memory 28 are applied to the addresses of the memory 22 and tone colors representing the proper tone colors corresponding to these switches are read out.

The voice parameter memory 20 prestores tone control parameters (hereinafter referred to as "voice parameters") necessary for realizing all selectable tone colors in correspondence to tone color codes of such tone colors. The tone color codes read out from the memories 21, 22 and 29 are applied to the address input of the voice parameter memory 20 and voice parameters corresponding to the applied tone color codes are read out. The read out voice parameters are supplied to the tone generation section 24. For example, reading operation of the memories 20, 21, 22, 27, 28 and 29 is made tone group by tone group on a time shared basis and the voice parameters are supplied to the tone generation section 24 in a state in which they are divided for the respective tone groups. The tone generation section 24 distributes the supplied voice parameters to the tone generation systems TG1–TG5 corresponding to the tone groups and sets the tone colors of tone signals generated in these tone generation systems in accordance with the supplied voice parameters.

Figure 8:
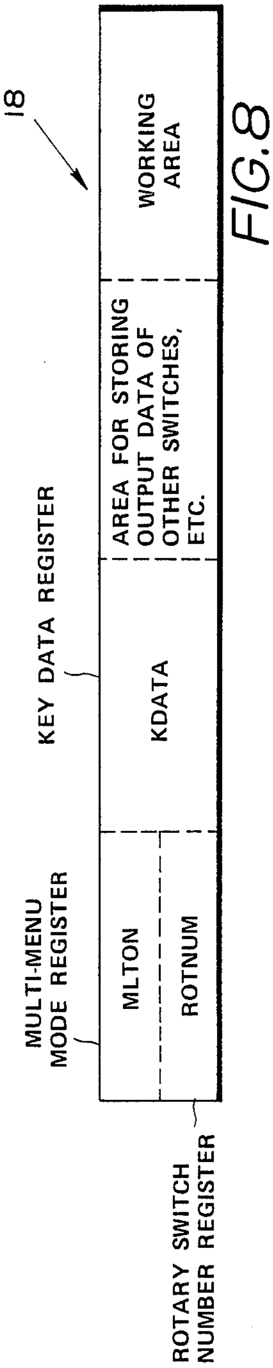
FIG. 8 is a diagram showing an example of registers included in the working and data memory in FIG. 3.

FIG. 8 shows an example of registers included in the working and data memory 18. MLTON denotes a multi-menu mode register. When contents stored in this register are a signal "1", it represents that the multi-menu mode has been selected whereas when they are a signal "0", it represents that the panel mode has been selected. ROTNUM denotes a rotary switch number register which stores data representing a set position (voice menu position 1 or 2) of the rotary switch RSW in the multi-menu switch section 13. KDATA denotes a key data register which stores a key codes representing depressed keys assigned to respective tone generation channels and signals including key-on signals representing ON-OFF states of these keys. The tone generation channels herein mean channels in which each single tone is generated and they are different from the tone generation systems TG1–TG5 corresponding to the tone groups. In the memory 18, there are area for storing output data of other switches and setters and a working area. It is also possible to reverse the address and data in the data storage format in the memories 20, 21, 22, 27, 28 and 29. In the original tone memory 21 and the white switch memory 29, for example, may have addresses corresponding to all selectable tone color codes and store data representing the selected or assigned white switches in correspondence to these addresses.

Description of the program

Referring now to FIGS. 9–12, an example of the program executed by the microcomputer section 15 will be described.

Figure 9:
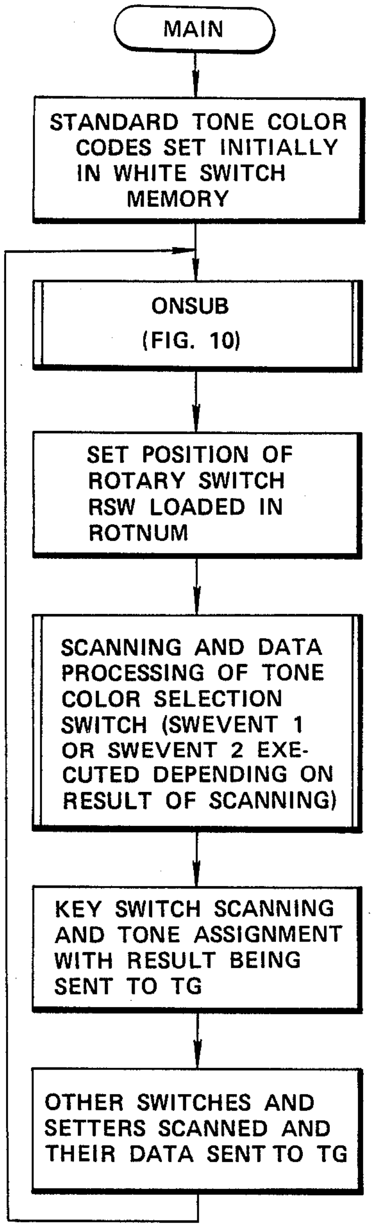
FIG. 9 is a flow chart showing an example of a main routine of a program executed by a microcomputer section in FIG. 3.
Figure 10:
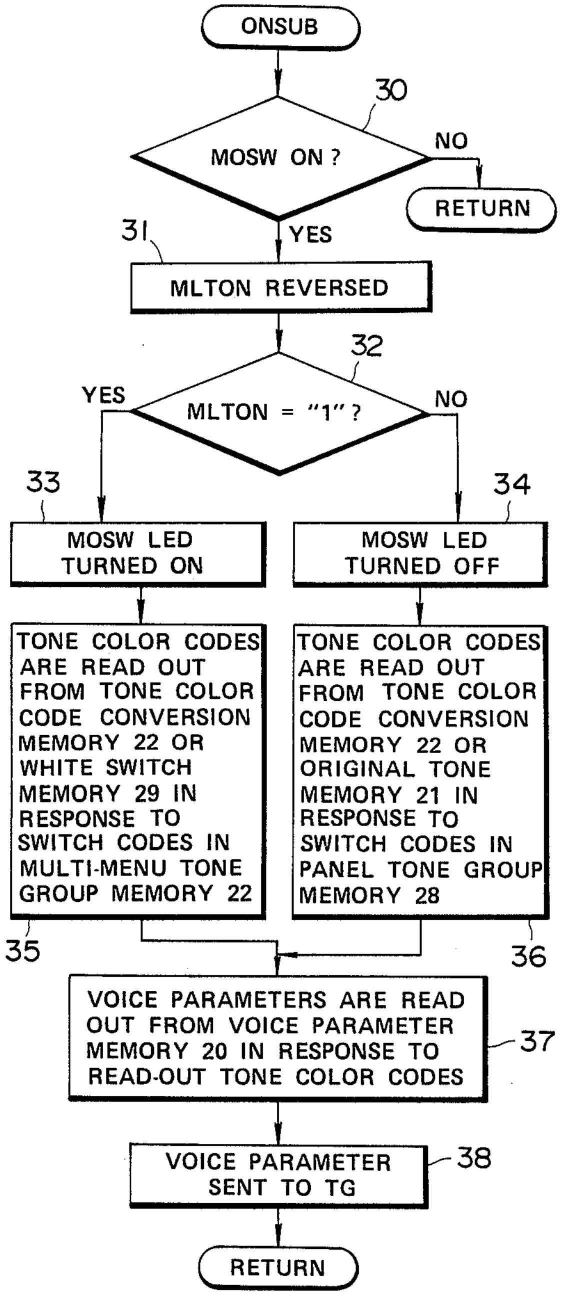
FIG. 10 is a flow chart showing an example of a subroutine ONSUB included in the main routine.
Figure 11A:
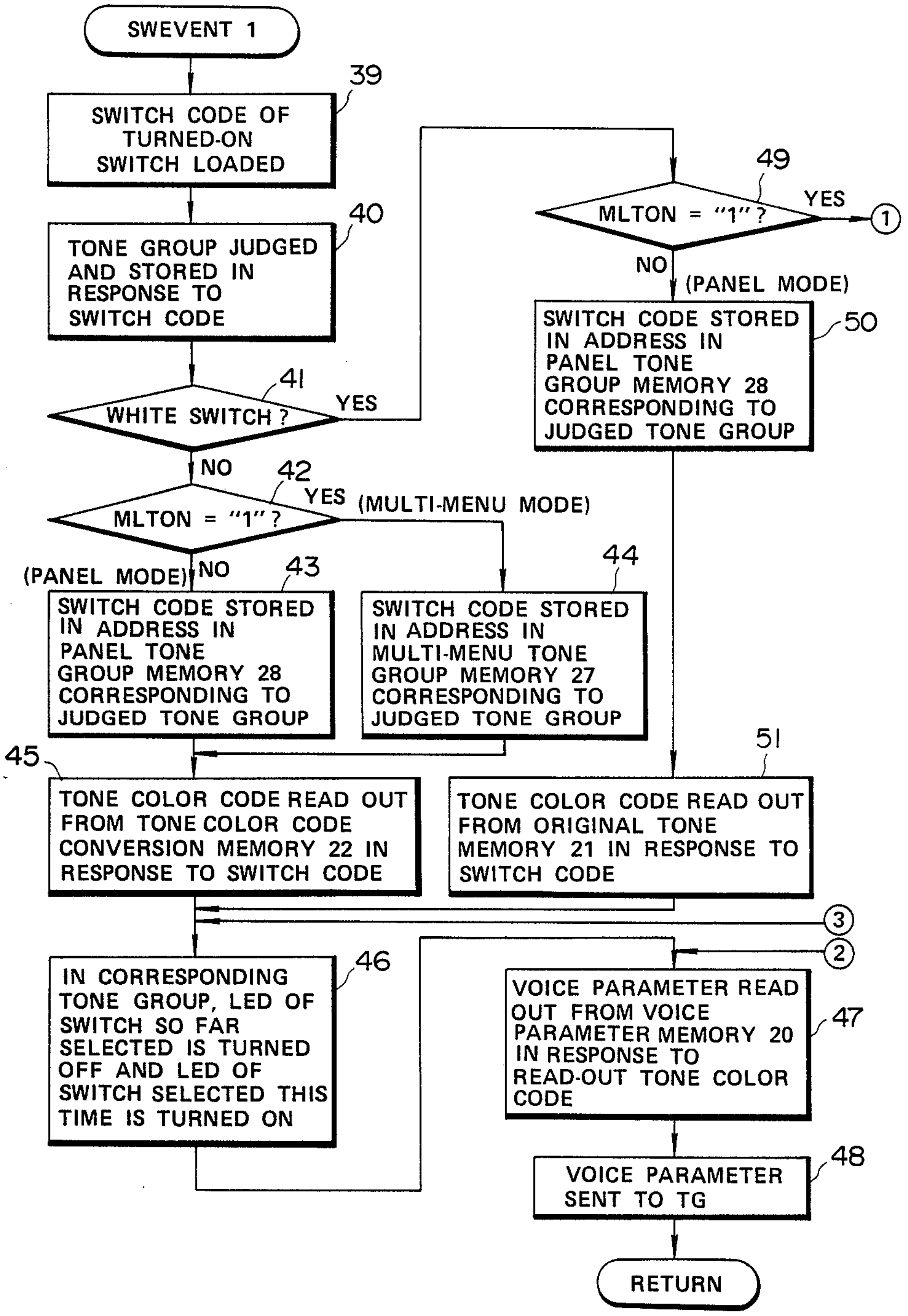
FIGS. 11A and 11B are flow charts showing a routine executed as interruption during switch-on time in the process of tone color selection switch scanning.
Figure 12:
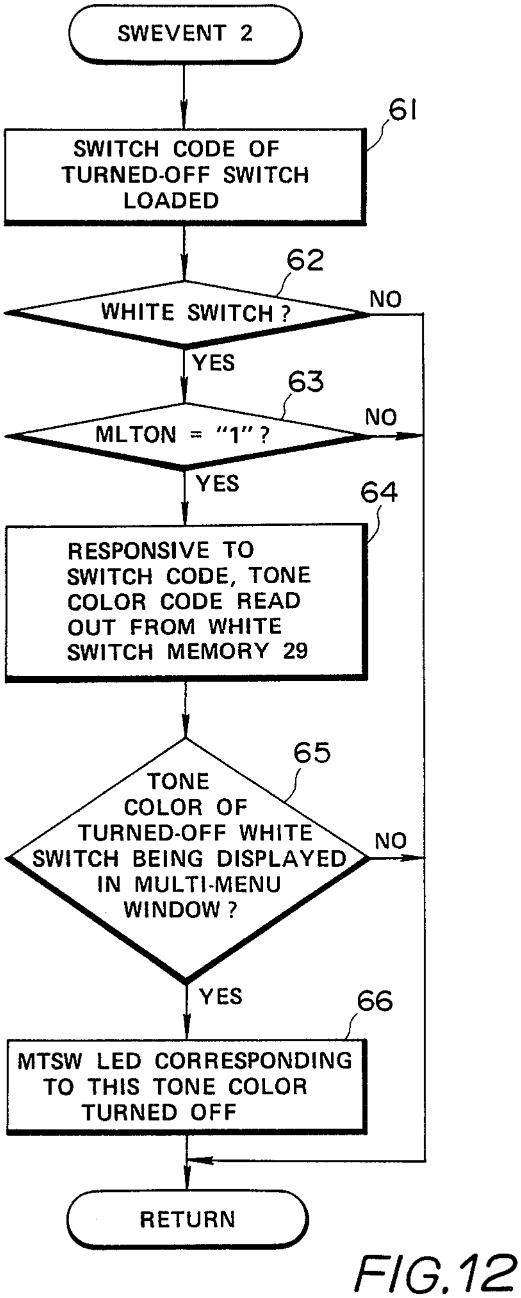
FIG. 12 is a flow chart of a routine executed as interruption during detection of change from switch-on to switch-off in the process of tone color selection switch scanning.

FIG. 9 is a flow chart of the main routine. Upon throwing-in of the power switch, a standard tone color code read out from the standard tone color code memory 23 is initially set in the white switch memory 29. Then, in subroutine ONSUB, state of the multi-menu ON switch MOSW is scanned and, when it is ON, a mode change processing is performed. Details of this subroutine ONSUB are shown in FIG. 10. Then, data representing the set position of the rotary switch RSW is loaded in the rotary switch number register ROTNUM. Then, respective switches in the tone color selection switch section 12 are sequentially scanned and, when a turned-on switch has been detected, a routine of SWEVENT 1 as shown in FIG. 11A is executed by interruption whereas if a switch which has been turned from the ON state to the OFF state has been detected, a routine of SWEVENT 2 as shown in FIG. 12 is executed by interruption. These routines SWEVENT 1 and SWEVENT 2 may be executed without interruption in the main routine. Then, the key switches in the key switch circuit 10 are sequentially scanned for detecting a depressed key or a released key and the assignment of tones to the tone generation channels is performed in accordance with results of the detection. In accordance with this assignment, processing for storing the key codes and key-on signals in the key data register KDATA is performed and data stored in the key data register KDATA is supplied to the tone generation section 24 (abbreviated as TG in the flow chart). No data of all channels is supplied commonly to the respective tone generation systems TG1–TG5 of the tone generation section 24 but data is distributed to the systems TG1–TG5 in correspondence to the tone groups (i.e., keyboards) to which the keys assigned to the respective channels belong. States of the other switches and setters in the panel section 11 are sequentially scanned and data corresponding to results of scanning is supplied to the tone generation section 24. Thereafter, the processing returns to the subroutine ONSUB in which the above described operation is repeated.

Referring to FIG. 10, the subroutine ONSUB will be described. In step 30, whether the multi-menu switch MOSW is ON or not is examined and, if the result is NO, the processing is immediately returned. If the result is YES, processing proceeds to step 31 in which the state of the multi-menu mode register MLTON is reversed. In step 32, whether the state of MLTON has been turned to "1" or not is examined. If the state is "1", the LED corresponding to the switch MOSW is lighted for indicating that the multi-menu mode has been selected. If the state is "0", the LED corresponding to the switch MOSW is extinguished for indicating that the panel mode has been selected (step 34). In the case of the multi-menu mode, processing proceeds to step 35 after step 33. In this step, switch codes representing the tone color selection switches which have been selectively operated for the respective tone groups are respectively read out from the multi-menu tone group memory 27 and, responsive to these switch codes, tone color codes are read out from the white switch memory 29 or the tone color code conversion memory 22. In the case of the panel mode, processing proceeds from step 34 to step 36. In this step, switch codes representing the tone color selection switches which have been selectively operated for the respective tone groups are respectively read out from the panel tone group memory 28 and, responsive to these switch codes, the tone color codes are read out from the original tone memory 21 or the tone color code conversion memory 22.

In next step 37, voice parameters are read out from the voice parameter memory 20 in response to the tone color codes read out in the preceding step 35 or 36. A voice parameter read out in response to a single tone color code may contain not only a parameter for forming a tone color but also various other data necessary for forming a tone such as data for setting pitch difference, vibrato data, attack pitch data, data for setting a tone level envelope, effect ON-OFF data and data for a modulation effect. In step 38, the voice parameters read out in the preceding step 37 are supplied to the tone generation section 24. The memory reading and parameter supply processings in steps 35–38 are performed tone group by tone group (e.g., on a time shared basis). Accordingly, the voice parameters supplied to the tone generation section 24 are distributed to the tone generation systems TG1–TG5 corresponding to these tone groups.

Figure 11B:
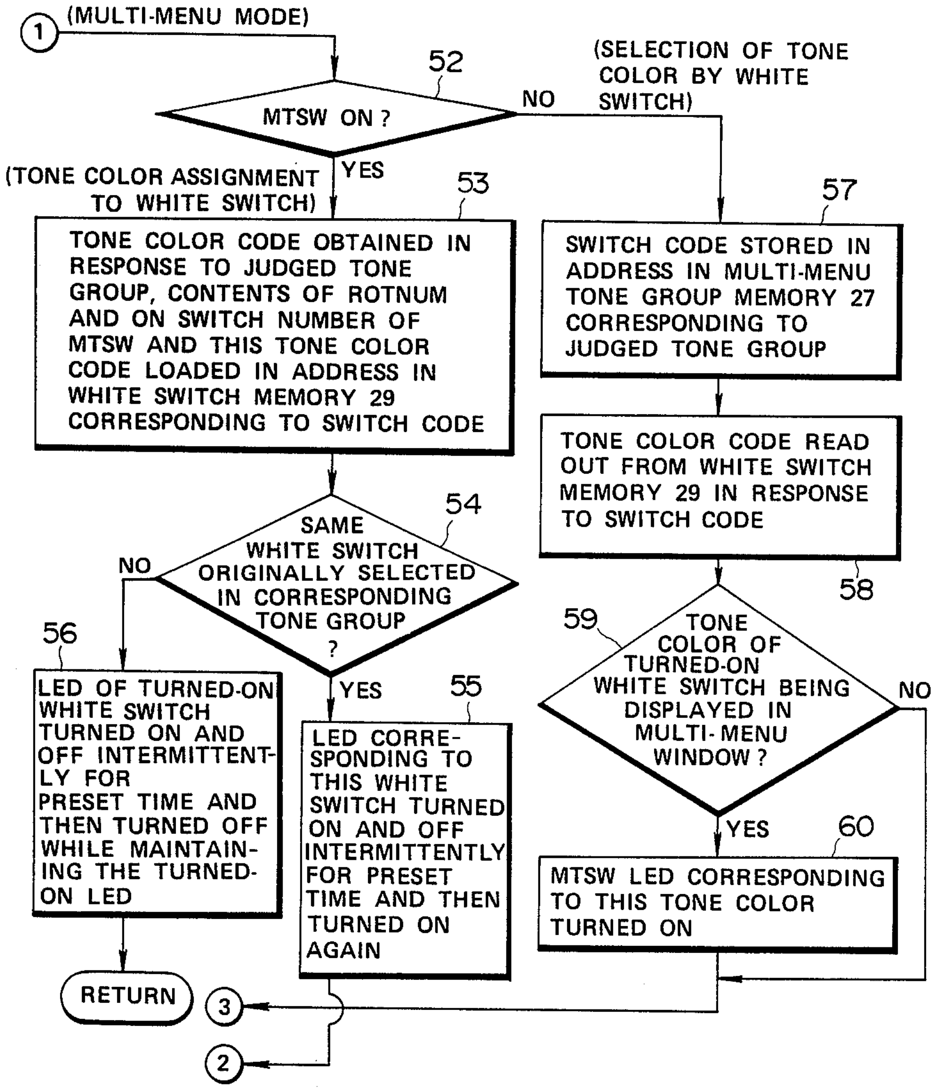

Referring now to FIGS. 11A and 11B, the routine of SWEVENT 1 will be described. FIGS. 11A and 11B are connected to each other through connection points 1, 2 and 3. As described previously, this routine is executed by interruption when any of the switches in the tone color selection switch section 12 has been turned on. First, the switch code of the tone selection switch which has been turned on is loaded (step 39) and then which tone group (i.e., which of the switch groups 12A–12F) this switch belongs to is judged in response to the switch code and stored (step 40).

(a) In the case where a switch other than the white switches has been turned on

In step 41, whether the switch which has been turned on is one of the white switches $WB_1$–$WB_{10}$ or not is examined. If the result is NO, whether contents of the register MLTON are "1" or not is examined in step 42.

In a case where a tone color selection switch other than the white switches has been turned on and the mode is the panel mode, processing proceeds to step 43 in which the switch code of the particular switch is stored in an address within the panel tone group memory 28 corresponding to the tone group to which this switch belongs.

In a case where a tone color selection switch other than the white switches has been turned on and the mode is the multi-menu mode, processing proceeds to step 44 in which the switch code of the particular switch is stored in an address within the multi-menu tone group memory 27 corresponding to the tone group to which this switch belongs.

In step 45, a tone color code is read out from the tone code conversion memory 22 in response to the switch code of the switch which has been turned on.

In step 46, the LED which has so far been lighted in the tone group corresponding to the switch which has been turned on this time (which corresponds to the switch which was previously turned on in this tone group) is extinguished and an LED corresponding to the switch which has been turned on this time is lighted. The LED which has once been lighted continues to be lighted until it is extinguished in this step 46. The switch code of the switch corresponding to the LED which has been lighted is stored and held in the memory 27 or 28. Thus, there is brought about a state in which the tone color corresponding to the turned-on switch has been selected.

In step 47, voice parameter is read out from the voice parameter memory 20 in response to the tone color code which was read out from the memory 22 (or 21, 29) in the preceding step. In step 48, the voice parameter which was read out in the preceding step is supplied to the tone generation section 24. In this case, the voice parameter is provided in correspondence to the tone group of the switch which has been turned on this time (i.e., the tone group which was judged and stored in step 40), the voice parameter being supplied to one of the tone generation systems TG1–TG5 corresponding to this tone group.

(b) In a case where the white switch has been turned on in the panel mode

In a case where one of the white switch has been turned on, step 41 is YES and processing proceeds to step 49. In this step, whether the contents of the register MLTON are "1" or not is examined. If the panel mode has been selected, MLTON is "0" so that processing proceeds to step 50. In step 50, the same processing as in step 43 is performed and the switch code of the white switch which has been turned on (one of $WB_1$–$WB_{10}$) is stored in an address of the panel tone group memory 28 corresponding to this tone group.

In step 51, a tone color code (representing a tone color proper to this white switch) is read out from the original tone memory 21 in response to the switch code of the white switch which has been turned on. Then the same processings as in steps 46, 47 and 48 are performed.

Accordingly, if the tone color selection operation is performed by a white switch during the panel mode, a tone color proper to the white switch can be selected. If, for example, the white switch WB2 in FIG. 4 is depressed in the panel mode, the tone color of "tuba" which is the proper tone color indicated there is selected.

(c) In a case where a desired tone color is assigned to a white switch

In a case where a desired tone color is assigned to a white switch, the mode is first set to the multi-menu mode in which the multi-menu switch section 13 is used. A desired one of the white switches $WB_1$–$WB_{10}$ is depressed and a tone color to be assigned to this white switch is selected by combination of the rotary switch RSW in the multi-menu switch section 13 and the tone color selection switch MTSW.

When the white switch has been depressed in the multi-menu mode, processing proceeds to step 52 through YES in step 41.

In step 52, whether any of the multi-menu tone color selection switch MTSW has been turned on or not is examined and, if the result is YES, processing proceeds to step 53.

In step 53, a tone color code representing the tone color to be assigned is determined in accordance with the tone group to which the white switch which has been turned on (which was stored in step 40), contents of the rotary switch number register ROTNUM (which represents which of the positions 1 and 2 in FIG. 6 the voice menu position presently set by the rotary switch RSW assumes) and number data representing which one of the fourteen switches the multi-menu tone color selection switch MTSW which has been turned on is. The determined tone color code is loaded in an address in the white switch memory 29 corresponding to the white switch which has been turned on. In this manner, a desired one among selectable tone colors is selectively assigned by the combination of the rotary switch RSW and the multi-menu tone color selection switch MTSW and the assigned data (i.e., the tone color code representing the assigned tone color) is stored in the white switch memory 29.

In determining the tone color code in the above described step 53, the contents of ROTNUM are determined taking into consideration not only the combination of the number of the switch MTSW which has been turned on but also the tone group of the white switch which has been turned on because, by doing so, the tone control state is made different depending upon the tone group though the tone color is nominally the same and a substantially different tone color thereby is produced. For this purpose, even if the name of the tone color selected by the multi-menu switch section 13 (i.e., the combination of RSW and MTSW) is the same, contents of the tone color are made different if the tone group to which the white switch to be assigned with the tone color is different. By differring the tone color code in this manner, contents of the voice parameter read out from the memory 20 becomes somehow different with a result that the state of the tone color controlled by this voice parameter becomes different.

As will be apparent from the foregoing description, the multi-menu switch section 13 (particularly the combination of the rotary switch RSW and the tone color selection switch MTSW) performs a function of means for selecting a tone color to be assigned from among plural tone colors, if viewed from the standpoint of assignment of a desired tone color to the white switch. As to this function, it is not necessary to provide white switches for a plurality of tone groups but the white switches may be provided for a single tone group only. If, however viewed from the standpoint of selection of tone colors corresponding to respective tone groups on the assumption that there are plural tone groups, the multi-menu switch section 13 (particularly the combination of RSW and MTSW) performs a function of tone color selection means which is common to all of the tone groups. In this case, the white switches $WB_1$–$WB_{10}$ in the respective tone groups perform a function of tone group designation means for designating which tone group the multi-menu switch section 13 which is the common tone color selection means is to be used for or which tone group information corresponding to the tone color selected by this multi-menu switch section 13 is to be supplied to.

Reverting to FIG. 11B, in step 54, whether or not the same white switch was originally selected in the corresponding tone group (i.e., whether the LED corresponding to the white switch which has been depressed this time has already been lighted and the tone control corresponding to the tone color of this white switch is now being performed in this tone group) is examined. If the result is YES, processing proceeds to step 55 in which the LED corresponding to this white switch is changed from the lighted state to an intermittently lighted state and this intermittent lighting is continued for a predetermined length of time and thereafter the lighted state is restored. Since the tone color of the tone being sounded is changed in this tone group by assigning a new tone color to the white switch in the tone color selection state, it is necessary to call attention of the player to such change of the tone color by such indication of the LED.

If step 54 is NO, processing proceeds to step 56. This step indicates that another tone color selection switch is being selected in the corresponding tone group. In step 56, lighting of the LED corresponding to the switch which is presently being selected is continuously lighted and the LED corresponding to the white switch which has been depressed this time is intermittently lighted for a predetermined length of time. By this intermittent lighting of the LED, change of the tone color assigned to the white switch is indicated. After step 56, processing returns immediately. In assigning a desired tone color to a desired white switch, therefore, contents stored in the multi-menu tone group memory 27 or the panel tone group memory 28 are not changed by depression of the white switch but the assignment of the tone color (change of the contents of assignment) is performed while the tone color selection state brought about by some other tone color selection switch is maintained.

After step 55, processing proceeds to steps 47 and 48. When the processing has been performed through step 55, the contents of tone color assignment of the white switch itself have been changed so that it is necessary to change the voice parameter which is presently being used for the tone control needs to be immediately changed to one corresponding to the newly assigned tone color.

(d) In a case where a tone color assigned to a white switch is selected

In a case where a tone color which has been assigned to a white switch is selected, the multi-menu mode is selected and a desired one of the white switches $WB_1$–$WB_{10}$ is depressed.

When the white switch has been depressed in the multimenu mode, processing proceeds to step 52 as described previously in which whether any of the multi-menu tone color selection switches MTSW has been turned on or not is examined. If no switch has been turned on, it means that a tone color has been selected by the white switch and processing proceeds to step 57. This step 57 is the same processing as the above described step 44 and the switch code representing the turned-on white switch is stored in an address in the multi-menu tone group memory 27 corresponding to the tone group.

In next step 58, a tone color code is read out from the white switch memory 29 in response to the switch code of the turned-on white switch. This white switch memory 29 stores, as described previously, the tone color code loaded in step 53.

In step 59, whether or not an indication representing the tone color which has been assigned to the white switch which has been turned on this time exists in the voice menu position appearing in the menu window MMW of the multi-menu switch section 13. This can be judged on the basis of the tone color code of the white switch and the contents of the register ROTNUM. If the indication representing the tone color assigned to the white switch appears in the multi-menu window MMW, the LED of tone color selection switch MTSW corresponding to this indication position is lighted (step 60). By this indication, the tone color which has been assigned to the presently selected white switch, i.e., the tone color which has been presently selected by this white switch is indicated in the multi-menu switch section 13. After step 60, steps 46, 47 and 48 described above are executed.

If the indication representing the tone color assigned to the turned-on white switch is not appearing in the multimenu window MMW, step 60 is NO and processing proceeds to step 46 without executing step 60. None of the LEDs corresponding to respective indications positions in the multimenu window MMW therefore is lighted whereby it is indicated that the indication of the tone color assigned to the presently selected white switch is not included in the tone color indication presently appearing in the multi-menu window MMW.

By the processings executed in steps 46, 47 and 48, the LED corresponding to the turned-on switch is lighted and a voice parameter corresponding to the tone color assigned to this white switch is supplied to the tone generation section 24. In this manner, a tone control for realizing a tone color assigned to a selectively operated white switch is performed. As described previously, since a tone color to be assigned can be changed as desired, various tone colors can be selected by operating a single white switch.

The LED corresponding to a predetermined position in the multi-menu tone color selection switch MTSW (i.e., a predetermined position in the multi-menu window MMW) which was lighted in step 60 is not extinguished by the routine shown in FIG. 11B. For lighting this LED only while the white switch is being depressed and turn off immediately upon turning off of the white switch, the routine of SWEVENT 2 shown in FIG. 12 is executed.

The routine shown in FIG. 12 is executed by interruption when any one of the switches in the tone color selection switch section 12 has been changed form the ON state to the OFF state.

In step 61, the switch code of the turned-off switch is loaded. In step 62, whether the turned-off switch is a white switch or not is examined in accordance with this switch code. If the result is NO, processing returns immediately. If the result is YES, processing proceeds to step 63 in which whether the contents of the register MLTON are "1" or not is examined. If the result is NO, processing returns immediately. If the result is YES, processing proceeds to step 64 in which a tone code is read out from the white switch memory 29 in response to this switch code. In next step 65, in the same manner as in step 59 in FIG. 11B, whether or not an indication representing the tone color assigned to the white switch which has been turned on this time exists in voice menu positions appearing in the multimenu window MMW. If the result is YES, processing proceeds to step 66 in which the LED of the multi-menu tone color selection switch MTSW corresponding to this indication position is extinguished. This LED was lighted in step 60 in FIG. 11B.

[Description about tone generation in the systems TG1–TG5]

Figure 13:
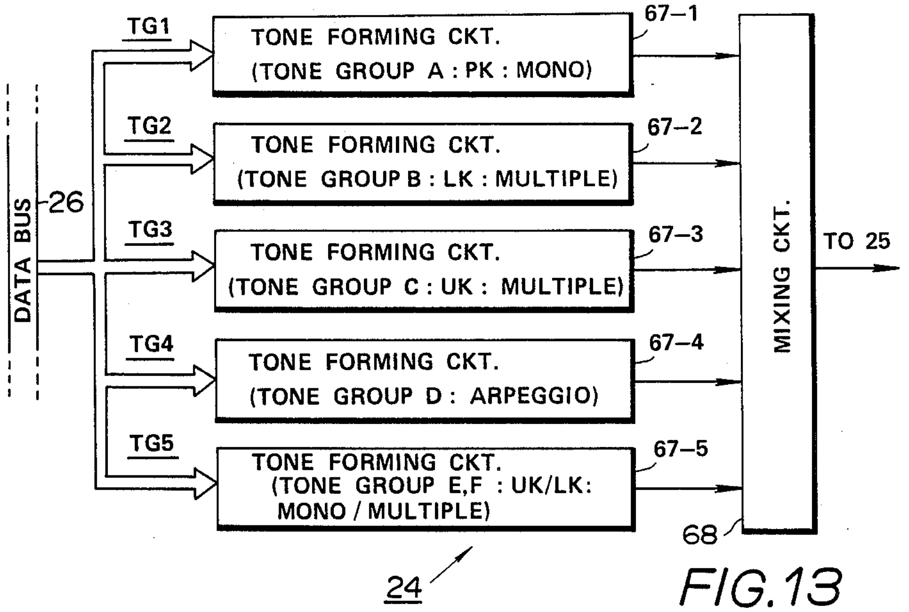
FIG. 13 is a block diagram showing an example of internal construction of a tone generation section in FIG. 3.

FIG. 13 schematically shows an internal construction of the tone generation section 24. The tone generation systems TG1–TG5 corresponding to the tone groups A - F consist of respectively corresponding tone forming circuits 67-1 through 67-5. Data such as the key codes, key-on signals and voice parameters supplied from the microcomputer section 15 via the data bus 26 are applied to one of the tone generation systems TG1–TG5, i.e., one of the tone forming circuits 67-1 through 67-5, corresponding to a particular tone group. The tone forming circuits 67-1 through 67-5 store applied data (channel by channel in case plural tones can be 4 sounded simultaneously) and, responsive to this data, form a tone signal of a tone pitch corresponding to the depressed key and set and control the tone color, tone level and pitch of this tone signal in accordance with the voice parameter. In a tone forming circuit corresponding to a tone group for which plural tones can be sounded simultaneously, the above described forming and control of a tone signal is possible with respect to plural tone generation channels. In a tone forming circuit corresponding to a tone group for which a single tone only can be sounded, it is also desirable to adopt such construction as to enable tone signals to be produced in plural tone generation channels so that tone signals of the same tone pitch (the same note) can be generated simultaneously with slightly different pitches from each other for realizing an ensemble effect. The tone signals generated in the tone forming circuits 67-1 through 67-5 in the respective systems TG1–TG5 are mixed in a mixing circuit 68 and thereafter are supplied to the sound system 25.

The tone forming circuits 67-1 through 67-5 corresponding to the respective systems TG1–TG5 may be constructed of separate hardware circuits or, alternatively, a common hardware circuit may be shared commonly on a time shared basis by the respective systems TG1–TG5.

Figure 14:
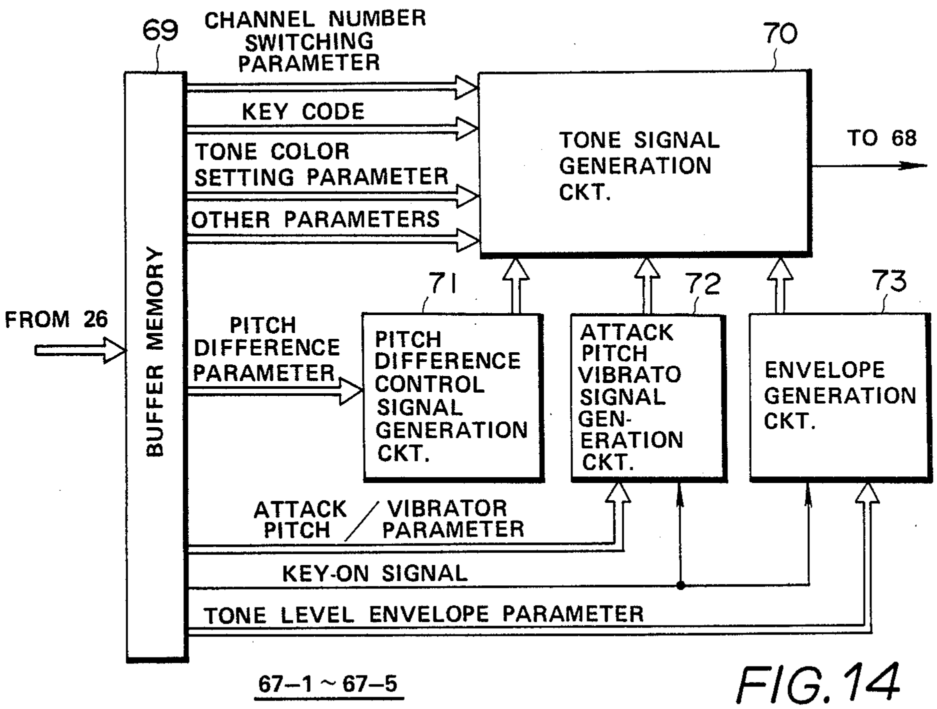
FIG. 14 is a block diagram showing an example of internal construction of a tone forming circuit in FIG. 13.

FIG. 14 shows an example of an internal construction of one of the tone forming circuits 67-1 through 67-5. Data concerning the particular tone group supplied through the data bus 26 is loaded in a buffer memory 69. A tone signal generation circuit 70 is a circuit which generates a tone signal of a tone pitch corresponding to the key code and imparts this tone signal with a tone color, tone level envelope and tone effects. For constructing this circuit 70, any desired tone generation or tone forming system can be selected from systems including an analog tone source system, a waveshape reading system and a tone forming system employing a frequency modulation operation.

The voice parameter includes various control parameters such as a tone color setting parameter, a pitch difference paameter, an attack pitch/vibrato parameter, a tone level envelope parameter and a channel number switching parameter. A pitch difference control signal generation circuit 71 generates a pitch difference control signal in response to the pitch difference parameter and supplies this signal to the tone signal generation circuit 70 for controlling pitch difference from a normal pitch in a tone signal generated in this circuit 70. An attack pitch vibrato signal generation circuit 72 generates, responsive to the attack pitch/vibrato parameter, a pitch modulation signal for controlling the attack pitch or a pitch modulation signal for performing a normal vibrato and supplies this signal to the tone signal generation circuit 70 for modulating the pitch of a tone signal generated in this circuit 70. As a signal representing an initiation timing of the attack pitch control, the key-on signal is applied to the circuit 72. An envelope generation circuit 73 generates, responsive to the lay-on signal, an envelope signal which is of a shape determined by the tone level envelope parameter and supplies this signal to the tone signal generation circuit 70. The tone level envelope parameter includes level data and time data of respective envelope portions such as attack, decay, sustain and release and, if required, data for amplitude modulation.

The channel number switching parameter is a parameter representing the number of channels in which a tone signal of the same note is generated. This parameter is used for an ensemble effect. An order is normally issued so that a tone signal of the same note is generated in a single channel but, in the case where the ensemble effect is to be imparted, an order is issued so that it is generated in two or more channels.

As described above, a voice parameter corresponding to one tone color contains plural parameters for setting and controlling various tone elements. If there is one parameter in one voice parameter which is different from a corresponding one in another voice parameter, tone colors realized by the respective voice parameters become different from each other. Even if, for example, there are two tones generated in different tone groups and contents of tone color setting parameters corresponding to these two tones are entirely the same and constant tone spectra-realized thereby are the same, tone colors realized will become different from each other between these tones if contents of any other parameter are different from each other.

In the present embodiment, in a case where a tone color is selected by using the multi-menu switch section 13 which functions as tone color selection means common to the respective groups, i.e., in a case where a tone color assigned to one of the white switches $WB_1$–$WB_{10}$ is selected by operating the white switch, tone colors realized in the respective tone groups are subtly or suitably different between the tone groups even if the tone color selected by the multi-menu switch section 13 is one and the same. As has already been described with reference to step 53 in FIG. 11B, in a case where the tone color selected by the multi-menu switch section 13 is assigned to one of the white switches, the tone color code thereof is determined not by the switch selected in the multi-menu switch section 13 (i.e., combination of RSW and MTSW) only but depending also on its corresponding tone group. Accordingly, in a case where tone colors have been selected with respect to different tone groups by the same switch (combination of RSW and MTSW) in the multi-menu switch section 13, contents of tone codes will differ between the tone groups even if the same name of tone color has been selected. As described previously, if the tone color code is different, contents of a voice parameter read out from the voice parameter memory 20 in response to the tone color code also are different. The tone forming circuits 67-1 through 67-5 in the tone generation systems TG1–TG5 corresponding to the respective tone groups form tones, with respect to the same tone color selected by the multi-menu switch section 13, in accordance with different voice parameters so that they form tones with tone colors which are different between the tone forming circuits 67-1 through 67-5.

Figure 15:
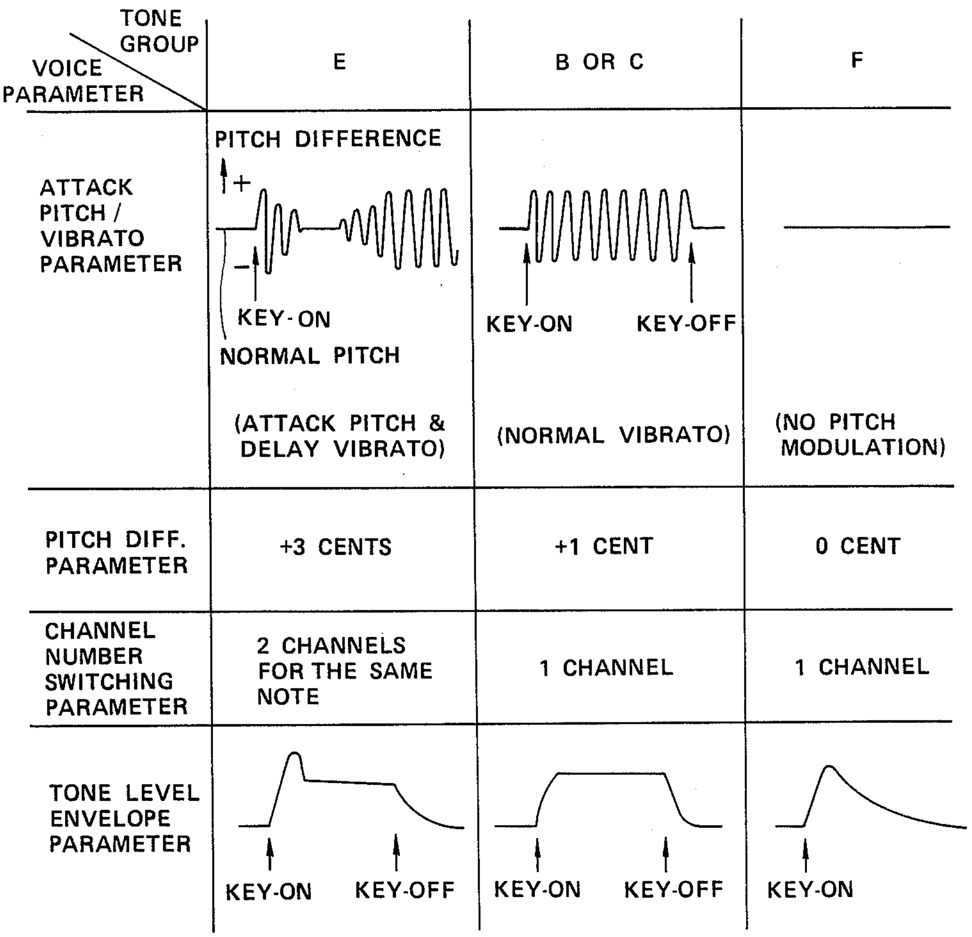
FIG. 15 is a diagram showing schematically an example of a state in which actual tone colors produced in respective tone groups sometimes differ from one another with respect to the same tone color selected in the multi-menu switch section in FIG. 5.

FIG. 15 shows an example of difference in tone colors realized actually in the respective tone groups with respect to the same tone color selected in the multi-menu switch section 13. In this example, the name of the tone color which has been selected in the multi-menu switch section 13 is "string 1" and tone colors actually realized are different between the tone group B or C and the tone group E and the tone group F. The vertical axis shows parameters in a voice parameter whose contents are different from corresponding parameters in other tone groups and sketches or descriptions appearing in crossings of the parameters of the vertical axis and the tone groups schematically show the tone control states realized in accordance with these parameters. Briefly explained, in the tone group E, a pitch modulation for performing the delay vibrato control after the attack pitch control is imparted due to difference in the contents of the attack pitch/vibrato parameter. In the tone group B or C, a normal vibrato modulation is imparted and in the tone group F, no pitch modulation is imparted. Further, on account of difference in the pitch difference parameter, a reference pitch in the pitch modulation becomes 3 cents higher than a normal pitch of the tone in the tone group E, 1.5 cent higher in the tone group B or C and there occurs no pitch difference in the tone group F. Further, on account of difference in the channel number switching parameter, a tone of the same note name is generated in two channels in the tone group E for producing the ensemble effect whereas a tone of the same note name is generated in one channel only in the other tone groups. In obtaining the ensemble effect, the pitch of the tone of the same note name generated in one channels may be slightly changed from the other. Further, on account of difference in the tone level envelope parameter, the shapes of envelope signals in the respective tone groups become different as illustrated. By reason of the differences in the control states of some tone elements, the total tone color of the tone becomes different between the respective tone groups despite that the nominal tone color of the tone is one and the same.

Parameters which are caused to differ between the tone groups are not limited to the above described ones but may be other parameters. For example, the tone color setting parameter may be caused to differ slightly so as to slightly differ a normal tone spectrum (i.e., the shape of the tone waveshape) or the manner of timewish change in this tone spectrum may be caused to differ. It is not necessary to cause the tone color actually produced to differ from one another between all of the tone groups with respect of a single nominal tone color, but it will suffice if a tone color in at least one tone group (tone generation system) is caused to differ from a tone color in other tone groups (tone generation systems).

Description of modified embodiments

In the above described embodiment, the multi-menu tone group memory 27 is provided separately from the panel tone group memory 28 (see FIG. 7) and the contents of the memory 27 are rewritten by the operation of the tone color selection switch in the multi-menu mode where the contents of the memory 28 are rewritten by the operation of the tone color selection switch in the panel mode. When the mode has been switched, therefore, the switch code representing a tone color which was selected in accordance with the respective tone groups in the preceding mode is held in the memory 27 or 28 and, when the mode has subsequently been returned to this mode, the previous tone color selection state can be reproduced in accordance with the data stored in the memory 27 or 28. In a case where such reproduction function is not required, the tone group memories 27 and 28 may be commonized. The commonized tone group memory has only to have six addresses corresponding to the respective tone groups and store a switch code of a switch which has been turned on in the tone color selection switch section 12 in an address corresponding to its corresponding tone group, regardless of the multi-menu mode or the panel mode. In this case, processings in steps 42 and 44 are omitted in the program of FIG. 11A and the panel tone group memory 28 or the multi-menu tone group memory 27 which are objects of the processings in steps 43, 50 and 57 are replaced by a common tone group memory. In steps 35 and 36 in FIG. 10, the panel tone group memory 28 or the multimenu tone group memory 27 for reading the switch code is replaced by a common tone group memory.

As regards assignment of a desired tone color (the tone control function in the broader sense) to the white switches, it is not essential to have plural tone groups but this invention is applicable to an electronic musical instrument having only one tone group. The number of the keyboards is not limited to three stages but it may be one stage. The number of the white switches may be one for each tone group or may be one for the entire tone groups. In short, it will suffice if the number of the white switches N is $1=\leqq N\leqq=M$ with respect to the total number of tone colors M which is available for selection.

The selection switch or selection means to which this invention is applicable is not limited to one for the tone color selection but this invention is applicable to selection switches or selection means for selecting other tone control functions such as effects, tone level and other control amounts.

Figure 16:
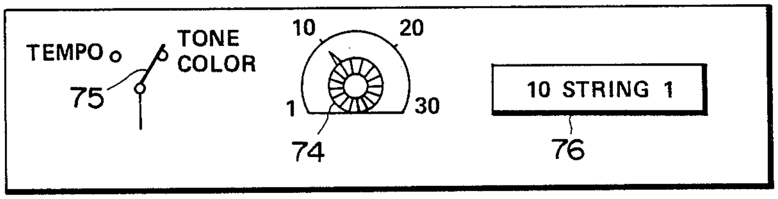
FIG. 16 is a plan view showing another example of tone color selection means which can replace the multi-menu switch section.

Means for selecting a tone color to be assigned to the white switch is not limited to the multi-menu switch as shown in the above described embodiment but any other switch may be employed. For example, a tempo setting device 74 for setting tempo of automatic performance tones as shown in FIG. 16 may be employed. In this case, a changeover switch 75 is provided for selectively switching the tempo setting device between the tempo setting purpose and the tone color selection. A display 76 is also provided so as to display information representing the tone color name which has been selected in the setting device 74 in case the setting device 74 is used for the tone color selection. When the setting device 74 is used for the tone color selection, it is possible to make arrangement so that a different tone color is selected for each degree settable in the device. If this setting device 74 is of a type which produces an analog signal, the analog signal is converted to a digital signal by means of an analog-to-digital converter.

Figure 17:
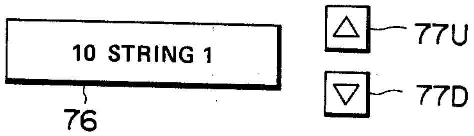
FIG. 17 is a plan view showing a modified example of the tone color selection means in FIG. 16.

FIG. 17 shows a modified embodiment of the one shown in FIG. 16. In this embodiment, data to be displayed in the display 76 can be changed by operation of cursol switches 77U and 77D. The tone color name displayed on the display 76 is the tone color to be assigned to the white switch which has been selected. The tone color name displayed on the display 76 is sequentially changed in a forward or reverse direction in a predetermined order in accordance with the operation of the switch 77U or 77D.

Figure 18:
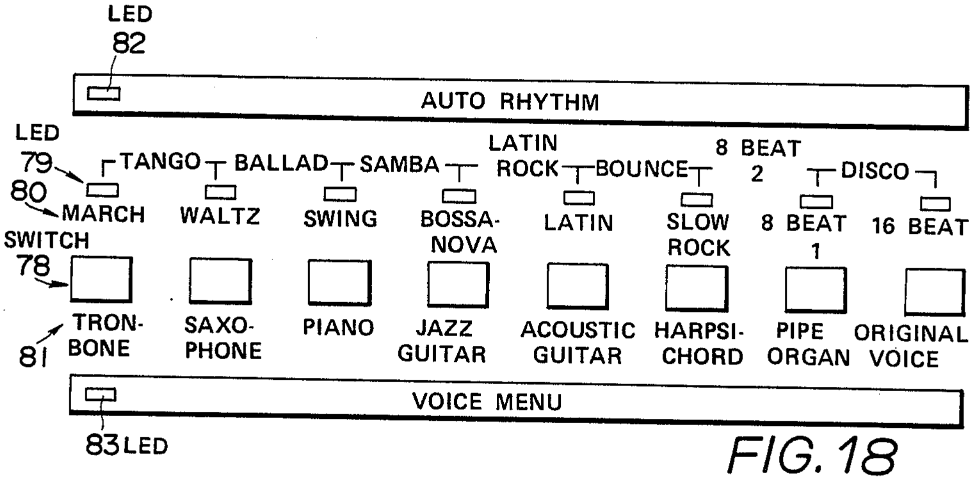
FIG. 18 is a plan view showing still another example of the tone color selection means which can replace the multi-menu switch section.

FIG. 18 shows an example in which a rhythm selection switch is utilized instead of the above described combination of the multi-menu switch or display and the tempo setter or cursol switch as the means for selecting a tone color to be assigned to the white switch. There are provided rhythm selection switches 78 in correspondence to rhythm names. Above the rhythm selection switches 78 are provided indications 80 representing rhythm names corresponding to the respective switches 78 and LEDs 79 corresponding to the respective indications 80. Below the respective switches 78 are provided indications 81 representing names of tone colors to be assigned to the white switches which can be selected by the respective switches 78. In this case, the rhythm selection switches 78 perform two functions, i.e., their proper rhythm selection function and a function for selecting a tone color to be assigned to the white switch. When the rhythm selection switches 78 perform the rhythm selection function (hereinafter called "selection mode"), an LED 82 affixed with an indication "AUTO RHYTHM" is lighted. In this state, by depressing a desired switch 78, one of the LEDs 79 corresponding to the depressed switch 78 is lighted and an auto rhythm corresponding to a rhythm name indicated by the lighting of the LED 82 is selected. When, on the other hand, the rhythm selection switches 78 perform the tone color selection function (hereinafter called "voice menu mode"), an LED 83 affixed with an indication "VOICE MENU" is lighted. In this state, by depressing a desired switch 78, one of the LEDs 79 corresponding to the depressed switch 78 is lighted and a tone color corresponding to a tone color name indicated by the lighting of the LED 82 is selected.

The LED 82 usually is lighted and the switches 82 function in the rhythm selection mode. In this state, if one of the white switches $WB_1$-$WB_{10}$ (FIG. 4) in some tone group has been depressed, the LED is extinguished and the LED 83 is lighted changing the mode to the voice menu mode. At this time, the tone color code assigned to the depressed white switch is read out from the white switch memory (e.g., 29 in FIG. 7) and the LED 79 of the switch 78 corresponding to this tone color is lighted so that it can be recognized which tone color is presently assigned to that white switch. If another desired rhythm selection switch 78 is depressed while the white switch is kept depressed, a corresponding LED 79 is intermittently lighted and a tone color corresponding to the switch 78 is set in this white switch (i.e., stored in the white switch memory). If the white switch is released, the LED 83 is extinguished and the LED 82 is lighted restoring the mode to the rhythm selection mode.

In the above described example, the mode changing is made depending upon whether the white switch is depressed or not. The mode changing however is not limited to this but may be made by other suitable means such, for example, as a separately provided mode switching switch.

In the rhythm selection mode, not only a rhythm corresponding to each of the switches 78, but also another rhythm can be selected by depressing two adjacent switches simultaneously. In the voice menu mode also, another tone color can be selected by simultaneously depressing plural switches 78.

As a means for selecting a tone color to be assigned to the white switch, a switch in the tone color selection switch section 12 may also be utilized.

In the above described embodiments, tone color coded of tone colors assigned to the respective white switches are stored in the white switch memory 29. Alternatively, a voice parameter of the assigned tone color may be directly stored in this memory 29.

As described above, according to the present invention, one of plural tone control functions can be selectively assigned to one or more of plural switches which can select their proper tone control functions so as to select either its proper tone control function or its assigned tone control function according to a selected mode so that an efficient selective operation can be made in accordance with a desired manner of switch selection operation. In other words, in a case where it is desired to perform the selection operation by an easy manipulation with respect to a relatively small number of switches while securing a sufficient number of selectable tone control functions, the selection operation can be made in the second mode (multi-menu mode). In a case where it is desired to select a desired function from among a number of tone control functions by a single selection operation, the selection operation can be made in the first mode (panel mode). Since, according to the invention, a predetermined switch (white switch) can be commonly used in the two modes, the number of switches as a whole can be saved so that it is advantageous in respects of the manufacturing cost, space and operability.

Further, according to the invention, selection means for selecting a tone control function is used commonly with respect to plural tone generation systems capable of independently selecting tone control functions such as tone color and tonal effects and, accordingly, the construction of the selection means as a whole can be simplified and made less expensive. Besides, since contents of control are made to differ between the tone generation systems even in a case where the same tone control function has been selected between the different systems, the likelihood that a common tone control is effected with respect to the respective systems is removed by employing a common selection means whereby monotonousness in the generated tone can be obviated.

What is claimed is:

1. An electronic musical instrument comprising:

musical information supply means for selectively supplying either first or second musical information wherein the first musical information represents a first variant of certain tone characteristics and the second musical information represents a second variant of said certain tone characteristics, wherein said musical information supply means is pre-assigned independent of any operator of the electron musical instrument to supply said first musical information;

assignment means for selecting said second musical information from among plural musical information and assigning said selected second musical information to said musical information supply means;

mode selection means for selecting a first mode or a second mode from among a plurality of modes; and tone signal forming means supplied with said first musical information by said musical information supply means when said first mode has been selected by said mode selection means and supplied with the assigned second musical information by said musical information supply means when said second mode has been selected by said mode selection means, for forming a tone signal corresponding to a tone having characteristics determined by the supplied musical information.

2. An electronic musical instrument as defined in claim 1 wherein said musical information supply means comprises selector means which selects and outputs the first musical information when said first mode has been selected by said mode selection means and selects and outputs the second musical information when said second mode has been selected by said mode selection means.

3. An eletronic musical instrument as defined in claim 1 further comprising third musical information corresponding to characteristics of a third tone parameter, wherein said musical information supply means is further pre-assigned with said third musical information, the musical information supply means further comprises selection means for selecting either said first musical information or said third musical information and said musical information supply means supplying the third musical information instead of the first musical information to the tone signal forming means when said first mode has been selected by said mode selection means and said third musical information as been selected by said selection means.

4. An electronic musical information as defined in claim 1 wherein said musical information supply means comprises memory means for storing data corresponding to musical information to be supplied and switch means to be operated when the musical information is to be supplied.

5. An electronic musical instrument as defined in claim 1 wherein said assignment means includes display means for displaying said second musical information which said assignment means has assigned.

6. An electronic musical instrument as defined in claim 1 which further comprises plural musical information selection means for selecting musical information determining characteristics of a tone, each musical information selection means including a manual operator which is colored with a predetermined tone color which is different form respective tone colors corresponding to other manual operators of said plural musical information selection means.

7. An electronic musical instrument as defined in claim 1 wherein the musical information determines a tone color.

8. An electronic musical instrument comprising:

musical information supply means for selectively supplying either first or second musical information, wherein the first musical information represents a first variant of certain tone characteristics and the second musical information represents a second variant of said certain tone characteristics, wherein said musical information supply means is pre-assigned to supply said first musical information;

assignment means for selecting said second musical information forma mong plural musical information and assigning said second selected musical information to said musical information supply means;

mode selection means for selecting a first mode or a second mode from among a plurality of modes; and tone signal forming means supplied with said first musical information by said musical information supply means when said first mode has been selected by said mode selection means and supplied with the assigned second musical information by said musical information supply means when said second mode has been selected by said mode selection means, for forming a tone signal corresponding to a tone having characteristics determined by the supplied musical information;

wherein said information supply means comprises first memory means for storing data corresponding to the first musical information, second memory means for storing data corresponding to the assigned second musical information and readout means for selectively reading out stored data from one said first and second memory means in response to selection of one of said first and second modes by said mode selection means.

9. An electronic musical instrument comprising:

musical information supply means for selectively supplying either first or second musical information, wherein the first musical information represents a first variant of certain tone characteristics and the second musical information represents a second variant of said certain tone characteristics, wherein said musical information supply means is pre-assigned to supply said first musical information;

assignment means for selecting said second musical information from among plural musical information and assigning said selected second musical information to said musical information supply means;

mode selection means for selecting a first mode or a second mode form among a plurality of modes; and tone signal forming means supplied with said first musical information by said musical information supply means when said first mode has been selected by said mode selection and supplied with the assigned second musical information by said musical information supply means when said second mode has been selected by said mode selection means, for forming a tone signal corresponding to a tone having characteristics determined by the supplied musical information;

wherein said assignment means comprises musical information selection means for selecting one set of musical information from among a plurality of sets of musical information and memory means for storing data corresponding to the set of musical information selected by said musical information selection means as data corresponding to the second musical information.

10. An electronic musical instrument comprising:

a plurality of tone generation systems, each having tone forming means for forming tones;

selection means for selecting musical information which determines characteristics of a tone, wherein the selected musical information is used commonly by said respective systems; and supply means for supplying to said respective systems data in response to selection of the selected musical information, wherein the data supplied to each system is different from the data supplied to at least one other system, the tone forming means for said respective systems forming tones controlled in accordance with the data supplied by said supply means, wherein a tone formed in at least one of said tone generation systems has tone characteristics different from a tone formed in the other systems with respect to the same musical information selected by said selection means.

11. An electronic musical instrument as defined in claim 10 wherein said supply means supplies to the tone forming means of the corresponding system parameter data whose contents are different from each other notwithstanding that the same musical information has been selected by said selection means with respect to said at least one system and the other systems.

12. An electronic musical instrument as defined in claim 10 wherein said supply means comprises memory means for storing data corresponding to the musical information elected with respect to the respective systems.

13. An electronic musical instrument as defined in claim 10 wherein said musical information determines a tone color.

14. An electronic musical instrument comprising: a first musical information supply means, having a first manual operator, for supplying first musical information determining certain characteristics of a tone in response to with operation of said manual operator, said first musical information supply means being preassigned to supply second musical information determining certain characteristics different from the certain characteristics determined by first musical information;

second musical information supply means, having a second manual operator, for supplying musical information;

assignment means for assigning said second musical information to said second musical information supply means in response to operation of both said first manual operator and said second manual operator, said second musical information supply means supplying the assigned second musical information; and tone signal forming means, receiving the first musical information and the assigned second musical information, for forming at least one tone signal in accordance with said first musical information and said assigned second musical information.

15. An electronic musical instrument as defined in claim 14 wherein the first musical information determines a rhythm and the second musical information determines a tone color.

16. An electronic musical instrument as defined in claim 15 wherein said second musical information supply means is further pre-assigned with third musical information and comprises selection means for selecting either the assigned second musical information or the third musical information and supplies muscial information selected by said selection means in accordance with operation of the second manual operator.

17. An electronic musical instrument, comprising:

a plurality of tone genernation systems, each having tone forming means for forming tones;

selection means for selecting one musical information from among plural items of musical information, wherein the items of musical information determine characteristics of a tone and are used commonly for said respective systems;

plural supply means, which correspond to said plurality of tone generation systems, each capable of outputting a musical tone parameter corresponding to the selected musical information, the musical tone parameter supplied by at least one of said plural supply means being substantially similar to but differing in part from the musical tone parameter supplied by at least one other of said plural supply means with respect to the same selected musical information; and designating means for designating one or ones of said plural supply means to supply said musical tone parameter, the designated one or ones of said plural supply means supplying said musical tone parameter to the corresponding tone generation system or systems;

wherein the tone forming means for said corresponding tone generation system or systems form tones which are controlled in accordance with said musical tone parameter supplied by said designated supply means.

18. A tone generation system for an electronic musical instrument, comprising:

a first tone generation subsystems, including (a) first tone forming means for forming tones in accordance with parameter data supplied to the first tone forming means, and (b) first supply means for supplying to said first tone forming means parameter data corresponding to musical information assigned to the first supply means;

a second tone generation subsystem, including (a) second tone forming means for forming tones in accordance with parameter data supplied to the second tone forming means, and (b) second supply means for supplying to said second tone forming means parameter data corresponding to musical information assigned to the second supply means;

selection means for selecting a set of musical information from a plurality of sets of musical information which determine the characteristics of a tone; and assignment means for supplying the selected set of musical information to at least one of the first and second tone generation subsystems, wherein the parameter data received by the first tone forming means is different from the parameter data received by the second tone forming means when the same musical information is assigned to the first and second supply means, the tones formed by the first tone forming means thereby having tone characteristics different from those of tones formed by the second tone forming means.

19. A tone generation system for an electronic musical instrument according to claim 18, including means for causing the parameter data received by the first tone forming means and the parameter data received by the second tone forming means to be different from one another when the same musical information is assigned to the first and second supply means.

* * * * *